Oct. 19, 1965 M. S. WILSON 3,213,365
MULTIRANGE HOOK-ON METER USING SELECTIVELY ACTUATED
SHORTED TURN FOR RANGE CHANGING
Filed Sept. 1, 1961

INVENTOR.
MYRON S. WILSON
BY
Irving M. Freedman
HIS ATTORNEY

United States Patent Office 3,213,365
Patented Oct. 19, 1965

3,213,365
MULTIRANGE HOOK-ON METER USING SELECTIVELY ACTUATED SHORTED TURN FOR RANGE CHANGING
Myron S. Wilson, South Lynnfield, Mass., assignor to General Electric Company, a corporation of New York
Filed Sept. 1, 1961, Ser. No. 135,484
5 Claims. (Cl. 324—115)

The subject invention relates to an improved electrical measuring instrument of the hook-on type, and more particularly, to a multi-range hook-on instrument.

Hook-on instruments generally have a magnetic yoke or core which can be opened, hooked over a conductor and closed thereover for current measuring purposes without cutting or otherwise disturbing the conductor. It is frequently necessary or desirable to incorporate in such instruments a plurality of ranges when accuracy and ease of reading is required. It is also desirable to be able to utilize the hook-on instrument for the measurement of both alternating and direct current voltages and for the measurement of resistance.

It is an object of the present invention to provide an improved multi-range hook-on ammeter.

It is another object of the present invention to provide an improved hook-on ammeter which may be utilized for voltage and resistance measurements.

It is a further object of the present invention to provide an improved, yet rugged, simplified and inexpensive multirange hook-on instrument.

It is a still further object of the present invention to provide an improved hook-on multi-range instrument requiring a minimum of parts and exhibiting reduced size and weight.

Further objects and advantages of the present invention will become apparent as the following description proceeds and the features of novelty which characterize the invention will be pointed out with particularity in the claims annexed to and forming a part of this specification.

In accordance with one form of the invention, a hook-on instrument is provided having a magnetic core which may be opened so that the core may be placed about a conductor and subsequently closed. A plurality of current ranges are provided by a coil wound about the core with the leads thereof connected to a resistor for selectively shunting or shorting the coil and providing a back M.M.F. which opposes the M.M.F. provided by the core to the indicating instrument associated therewith. The same coil may be utilized in a voltmeter arrangement by means connecting the coil through a selectively adjusted resistor to a pair of external leads which may be connected across the voltage under measurement.

The same coil may be further utilized to provide resistance indications by connecting the coil in series with a battery and a pair of leads which are connected across the resistance to be measured.

More particularly, the indicating instrument may be of the radial-vane, moving-iron type to minimize the number of components and electrical connections required.

For a better understanding of the invention, reference may be had to the accompanying drawings in which.

Figure 1:
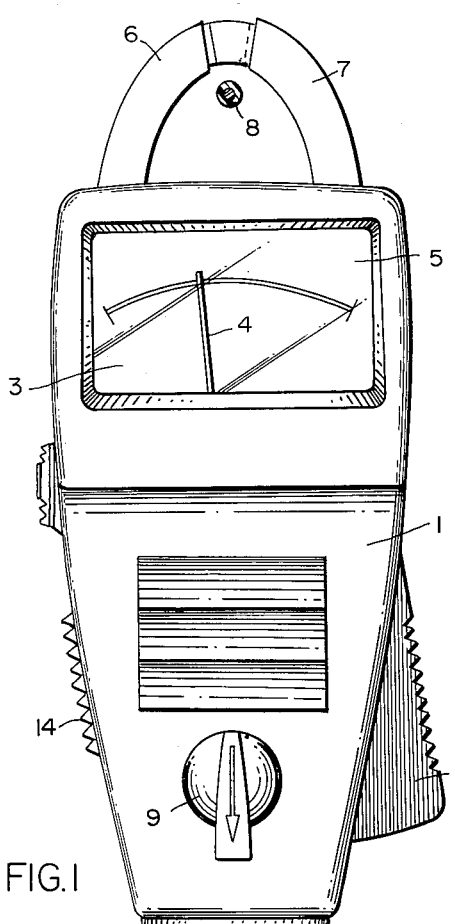
FIG. 1 is an elevation view showing a hook-on instrument embodying the invention.

Referring to FIG. 1, a hook-on instrument as shown comprising a case 1 having positioned therein an indicating instrument including a scale plate 3 and a cooperating pointer 4 viewable through a transparent member 5. A pair of relatively movable yoke or core members 6 and 7 extend from one end of the housing 1 and are adapted to be closed about a conductor 8 to measure the current flow therethrough. The range changing switch 9 enables the selection of the desired range, and terminals 10, 11 and 12 enable the connection of external leads for use in voltage and resistance measurements. Serrations 14 on the housing 1 provide a grip for holding the instrument.

Figure 2:
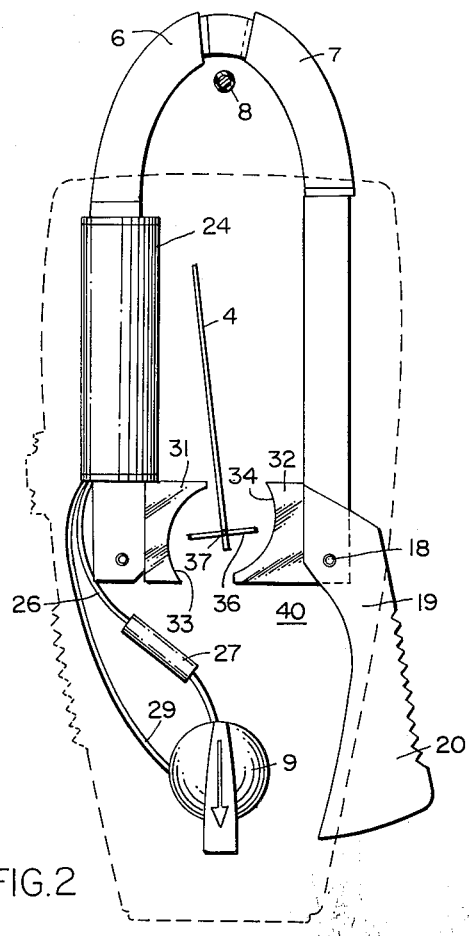
FIG. 2 is a partial view of the mechanism contained within the housing of FIG. 1 illustrating the magnetic circuitry associated with the invention.

Referring to FIG. 2, it will be seen that the magnetic core members 6 and 7 which may be of laminated construction in a manner well known in the art, are relatively movable such that the core may be opened by the rotation of member 7 about the pivot 18 in the clockwise direction. The movement or rotation of the core member 7 is facilitated by the nonmagnetic plastic extension 19 which is attached to the member 7 and which extends below the pivot 18. Extension 19 may be readily moved by pressure on the serrated trigger portion 20 which, as shown in FIG. 1, extends beyond the housing 1.

A coil 24 is positioned about a portion of the core member 6 and within the housing 1. One end of the coil 24 is connected through lead 26 and resistor 27 to one terminal of switch 9, while the other switch terminal is connected through lead 29 to the other side of the coil. Thus, coil 24 may be selectively shunted by resistor 27 through the actuation of switch 9. The connections are shown schematically in FIG. 3. The coil 24 may be fabricated by wrapping insulating tape around the core member 6 and winding the coil directly upon the insulation. Insulating tape may be subsequently wound about the finished coil. While coil sizes will vary depending upon the particular instrument and the measuring ranges desired, one coil which has proved satisfactory is, by way of example, constructed of 6600 turns of 0.0054 inch diameter copper wire forming a coil 2.075 inches long having internal dimensions of 0.315 by 0.350 inch.

A pair of laminated magnetic pole pieces 31 and 32 extend toward one another from the inner edges of the core members 6 and 7 and provide a pair of opposed arcuate pole faces 33 and 34 having positioned in the air gap therebetween a vane member 36 rotatably mounted about the axis 37. Pointer 4 is secured to the vane 36 for rotation therewith.

For details of electric instrument mechanism 40, which includes the pole pieces 31 and 32 and the vane 36 along with associated adjustment and scale distribution mechanisms, references may be had to copending application Ser. No. 135,483, filed on September 1, 1961 in the name of Edward M. Eadie, Jr., and assigned to the same assignee as the present invention. It is felt sufficient for purposes of the subject application to point out that the radial-vane moving instrument 40 will deflect an amount related to the magnitude of the magnetic field set up in the air gap between the pole faces 33 and 34. Thus, when the core members 6 and 7 are clamped about a conductor 8 through which an electric current is passing a magnetic field is induced in a magnetic circuit formed by the core members and including the region between the pole faces 33 and 34. The magntude of the magnetic field appearing across the pole faces will be related to the magnitude of the current flow through the conductor 8 and, accordingly, the deflection of the vane 36 and the attached pointer 4 will be related to and indicative of the magnitude of the current flow through the conductor 8.

It is frequently necessary or desirable to provide a plurality of measurement ranges when accuracy and ease of reading is required. When a single range instrument is utilized to indicate both high and low electrical values, the highest value to be measured necessarily determines the single range. In such an instrument, it becomes practically impossible to accurately differentiate between a plurality of low value indications. Additional alternating current instrument ranges may be provided through the use of the coil 24 and its selective shunting arrangement. When switch 9 is actuated to connect resistance 27 across the coil 24, the coil is "short-circuited" and provides a back magnetomotive force or M.M.F. which bucks or opposes the "forward" M.M.F. produced in the cores 6 and 7 by the current flow in the conductor 8. This provides an alternating current range which is of greater full scale magnitude than that provided without use of the coil 24. Thus, a multi-range, alternating current, hook-on ammeter is provided which is uncomplex, involves a minimum of parts and electrical connections, and is lightweight and extremely rugged. While only one resistance is shown as being selectively connectable in shunt with coil 24, it will be recognized that by providing additional resistances which may be selectively connected in shunt with coil 24, additional current ranges may be obtained.

The coil 24 may be utilized in combination with additional members to provide alternating and direct current voltage measurements.

Figure 3:
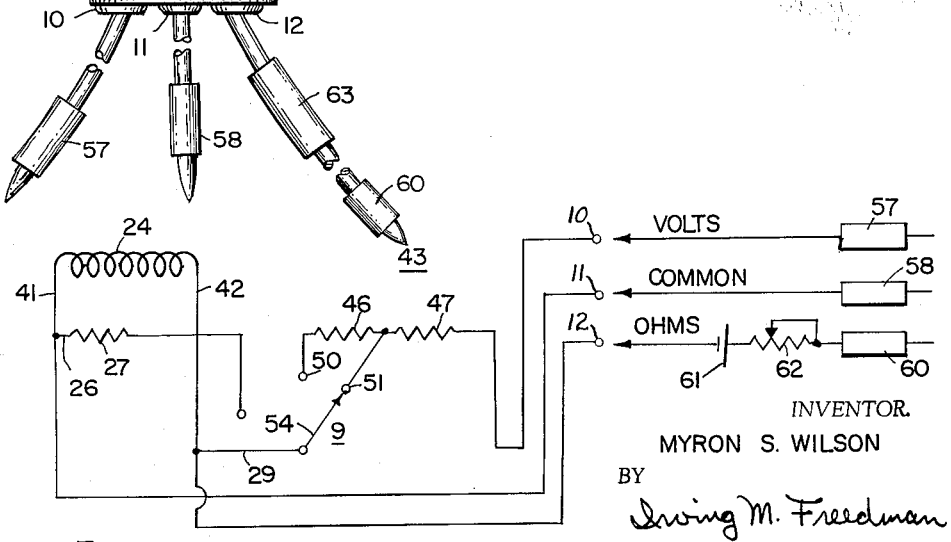
FIG. 3 is a circuit diagram in schematic form illustrating the electrical connections and components required to utilize the instrument for the measurement of voltage and resistance.

Referring to FIGS. 1 and 3, one end 41 of the coil is connected directly to a common terminal or connection 11 which, as shown in FIG. 1, is physically located at the bottom of the housing 1. The other side 42 of the coil 24 is connected to the wiper 54 of switch 9 which is utilized in a variable resistor switching arrangement 43. The variable resistor switching arrangement 43 includes fixed resistors 46 and 47 electrically connected in series with one end of the series arrangement connected to the volts terminal 10 physically located at the bottom of the housing 1. The other end of the resistor switching arrangement 43 is connected to terminal 50 of switch 9, while the junction between resistors 46 and 47 is connected to terminal 51 of the switch. Thus the ends of the coil 24 are conected in series with variable resistor 43 to terminals 10 and 11. Connectors or probes 57 and 58 may be selectively connected to the terminals 10 and 11 for connection across the points whose voltage differential is to be measured. The voltage under measurement will cause a current flow through coil 24 in accordance with the magnitude thereof to provide a magnetic field through the pole pieces 31 and 32 and cause an instrument 40 deflection in accordance with the magnitude of the voltage under measurement. Adjustment of switch 9 selectively controls the magnitude of the resistance in series with coil 24 to provide the desired voltage range. The probes 57 and 58 may be removed from the terminals 10 and 11 when the instrument is not being utilized for voltage measurments.

Coil 24 may be also utilized to provide resistance measurements. The end 42 of coil 24 is brought directly out to the "ohms" terminal 12 such that external connections may be made to the ends of the coil at terminals 11 and 12. An external ohmmeter accessory is incorporated in the connection between probe 60 and the "ohms" terminal 12 and incudes a battery 61 in series with a variable resistor 62 contained within a housing 63. When probes 58 and 60 are connected across an unknown resistor current will flow through the coil 24 because of the battery 61 in accordance with the magnitude of the resistor under measurement. The magnitude of the current flow and hence of the resistor will be indicated by a deflection of instrument 40 on an appropriate scale portion of scale 4. Variable resistor 62 may be utilitzed to zero the instrument and compensate for variations in the voltage of battery 61 due to ageing.

During voltage or resistance measurements the switch 9, which connects the resistor 27 and shunt with coil 24, will be in the open position. Thus, coil 24 may be selectively utilized to provide voltage and resistance measurements in addition to alternating current measurements.

Therefore, while a particular embodiment of the subject invention has been shown and described herein, it is in the nature of description rather than limitation, and it will occur to those skilled in the art that various changes, modifications and combinations may be made within the province of the appended claims without departing either in spirit or scope from this invention in its broader aspects.

What I claim as new and desire to secure by Letters Patent of the United States is:

1. A multi-range electrical instrument of the hook-on type comprising:

a pair of magnetic core members arranged to open and close about a conductor and forming a magnetic circuit whereby magnetic flux is induced in said magnetic circuit for current measuring purposes, said core members terminating in pole pieces defining therebetween an air gap in series with said magnetic circuit, indicating means having a plurality of current scales and a vane member rotatably mounted in said air gap so as to be responsive to the magnetic flux in said magnetic circuit, and means to selectively vary the current measurement range of said indicating means so that it will selectively indicate the current flowing in said conductor when read on the current scale corresponding to the selected current range, comprising:

a coil positioned about and magnetically coupled to one of said core members and current range switching means to selectively shunt said coil with different values of impedance to change the flux in said magnetic circuit by controlling the magnetomotive force introduced by said coil, said magnetomotive force introduced by said coil being opposed to the magnetomotive force in said magnetic circuit resulting from current flow through said conductor to thus change the current measurement range of said instrument.

2. A multi-range electrical instrument of the hook-on type comprising:

a pair of magnetic core members arranged to open and close about a conductor and forming a magnetic circuit whereby magnetic flux is induced in said magnetic circuit for current measuring purposes, said core members terminating in pole pieces defining therebetween an air gap in series with said magnetic circuit, indicating means having a plurality of current scales and a vane member rotatably munted in said air gap so as to be responsive to the magnetic flux in said magnetic circuit, and means to selectively vary the current measurement range of said indicating means so that it will selectively indicate the current flowing in said conductor when read on the current scale corresponding to the selected current range, comprising:

a coil positioned about and magnetically coupled to one of said core members, an impedance, and current range switching means having first and second positions for selectively connecting and disconnecting said impedance from a position in shunt with said coil to selectively vary the flux in said magnetic circuit for any given current in said conductor and thus change the measurement range of said indicator means.

3. A multi-range ammeter-voltmeter instrument of the hook-on type comprising:

a pair of magnetic core members arranged to open and close about a conductor and forming a magnetic circuit whereby magnetic flux is induced in said magnetic circuit for current measuring purposes, said core members terminating in pole pieces defining therebetween an air gap in series with said magnetic circuit, indicating means having first and second current scales and a voltage scale and a vane member rotatably mounted in said air gap so as to be responsive to the magnetic flux in said magnetic circuit, means to selectively vary the current measurement range of said indicating means so that it will selectively indicate the current flowing in said conductor when read on the current scale corresponding to the selected current range comprising:

a coil positioned about and magnetically coupled to one of said core members, an impedance, and current range switching means having first and second positions for respectively connecting and disconnecting said impedance from a position in shunt with said coil to selectively vary the flux in said magnetic circuit for any given current in said conductor and thus change the current measurement range of said indicator means, a resistance, and a pair of terminals, said range switching means having a third position for connecting said resistance in series with said coil across said pair of terminals to which a voltage under measurement may be connected to selectively provide voltage indications on said voltage scale in place of said current indications.

4. A multi-range ammeter-ohmmeter of the hook-on type comprising:

a pair of magnetic core members arranged to open and close about a conductor and forming a magnetic circuit whereby magnetic flux is induced in said magnetic circuit for current measuring purposes, said core members terminating in pole pieces defining therebetween an air gap in series with said magnetic circuit, indicating means having first and second current scales and a resistance scale and a vane member rotatably monuted in said air gap so as to be responsive to the magnetic flux in said magnetic circuit, means to selectively vary the current measurement range of said indicating means comprising:

a coil positioned about and magnetically coupled to one of said core members, an impedance, and current range switching means having first and second positions for selectively connecting and disconnecting said impedance from a position in shunt with said coil to selectively vary the flux in said magnetic circuit for any given current in said conductor and thus change the current measurement range of said indicator means, a battery, and a pair of terminals, said range switching means having a third position for connecting said coil in series with said battery across said terminals to which an impedance under measurement may be connected to selectively provide resistance indications on said resistance scale in place of said current indications.

5. A multi-range electrical instrument of the hook-on type comprising:

a pair of magnetic core members arranged to open and close about a conductor and forming a magnetic circuit whereby magnetic flux is induced in said magnetic circuit for current measuring purposes, said core members terminating in pole pieces defining therebetween an air gap in series with said magnetic circuit, indicating means having first and second current scales and a vane member rotatably mounted in said air gap so as to be responsive to the magnetic flux in said magnetic circuit, and means coupled to one of said core members to selectively induce an opposing flux in said magnetic circuit the magnitude of which is proportional to the magnitude of the flux induced by said conductor, said proportional relationship determining the scale factor between said first and second scales.

References Cited by the Examiner
UNITED STATES PATENTS 2,266,624    12/41    Hall _____ 324—127
2,948,853    8/60    Nylander _____ 324—115

FREDERICK M. STRADER, *Primary Examiner.*

WALTER L. CARLSON, *Exmainer.*